US011344839B2

(12) United States Patent
Joss et al.

(10) Patent No.: US 11,344,839 B2
(45) Date of Patent: May 31, 2022

(54) TEMPERATURE-SWING ADSORPTION PROCESS

(71) Applicant: CASALE SA, Lugano (CH)

(72) Inventors: Lisa Joss, Manchester (GB); Max Hefti, Zurich (CH); Marco Mazzotti, Zurich (CH)

(73) Assignee: CASALE SA, Lugano (CH)

(*) Notice: Subject to any disclaimer, the term of this patent is extended or adjusted under 35 U.S.C. 154(b) by 281 days.

(21) Appl. No.: 16/642,172

(22) PCT Filed: Aug. 9, 2018

(86) PCT No.: PCT/EP2018/071598
§ 371 (c)(1),
(2) Date: Feb. 26, 2020

(87) PCT Pub. No.: WO2019/042733
PCT Pub. Date: Mar. 7, 2019

(65) Prior Publication Data
US 2020/0306686 A1 Oct. 1, 2020

(30) Foreign Application Priority Data
Aug. 28, 2017 (EP) .................................... 17188071

(51) Int. Cl.
B01D 53/04 (2006.01)

(52) U.S. Cl.
CPC .... B01D 53/0462 (2013.01); *B01D 2253/108* (2013.01); *B01D 2256/10* (2013.01);
(Continued)

(58) Field of Classification Search
CPC ............... B01D 53/04; B01D 53/0462; B01D 2253/108; B01D 2256/10; B01D 2257/80;
(Continued)

(56) References Cited

U.S. PATENT DOCUMENTS 9,138,719 B1 9/2015 Eddaoudi et al.
11,034,903 B2* 6/2021 Doong .................... C10L 3/106
(Continued)

FOREIGN PATENT DOCUMENTS

WO 2015117738 A1 8/2015

OTHER PUBLICATIONS

International Preliminary Report on Patentability from International Application No. PCT/EP2018/071598 completed Nov. 29, 2019.
(Continued)

Primary Examiner — Frank M Lawrence, Jr.
(74) Attorney, Agent, or Firm — Dorsey & Whitney LLP

(57) ABSTRACT

A temperature swing adsorption process for removing a target component from a gaseous mixture, the process being carried out in a plurality of reactors, wherein each reactor performs: (a) adsorption of the target component providing a loaded adsorbent and a waste stream; (b) heating of the loaded adsorbent and desorption of target component, providing an output stream; (c) cooling of the adsorbent; a rinse step (a1) before the heating (b), wherein the loaded adsorbent is contacted with a rinse stream containing the target component, producing a purge stream depleted of the target component; a purge step (b1) before the cooling (c), wherein the adsorbent is contacted with the purge stream provided by another reactor while performing the rinse step (a1), thus producing an output stream containing the target component, wherein the rinse stream comprises at least a portion of the output stream provided by another reactor while performing the purge step (b1).

19 Claims, 4 Drawing Sheets

(52) U.S. Cl.
CPC .... *B01D 2257/504* (2013.01); *B01D 2257/80* (2013.01); *B01D 2259/403* (2013.01); *B01D 2259/40052* (2013.01); *B01D 2259/40064* (2013.01)

(58) Field of Classification Search
CPC ...... B01D 2257/504; B01D 2258/0283; B01D 2259/40045; B01D 2259/40052; B01D 2259/40064; B01D 2259/403; Y02C 20/40
USPC .... 95/114, 115, 139, 148; 96/121, 126, 127, 96/128, 143, 144, 146
See application file for complete search history.

(56) References Cited

U.S. PATENT DOCUMENTS

| | | | |
|---|---|---|---|
| 2005/0229784 A1* | 10/2005 | Thomas | C10L 3/10 95/188 |
| 2006/0204419 A1* | 9/2006 | Thomas | C10L 3/10 423/210 |
| 2010/0251887 A1 | 10/2010 | Jain | |
| 2012/0222552 A1 | 9/2012 | Ravikovitch et al. | |
| 2013/0192299 A1* | 8/2013 | Dolan | C10L 3/101 62/636 |
| 2014/0224118 A1* | 8/2014 | Zhou | C10L 3/106 95/8 |
| 2014/0326136 A1 | 11/2014 | Doong et al. | |
| 2015/0068397 A1 | 3/2015 | Boulet et al. | |
| 2019/0030479 A1* | 1/2019 | Joss | B01D 53/0462 |

OTHER PUBLICATIONS

International Search Report from International Application No. PCT/EP2018/071598 dated Sep. 7, 2018.

* cited by examiner

TEMPERATURE-SWING ADSORPTION PROCESS

FIELD OF THE INVENTION

The present invention relates to a process for separating a target component from a gaseous mixture also containing one or more side components, for example for separating carbon dioxide from a flue gas also containing nitrogen. In particular, the present invention relates to a process involving temperature-swing adsorption of said target component on a solid adsorbent.

PRIOR ART

The separation of a target component contained in a gaseous mixture is of notable importance in several fields, e.g. chemicals, fuels, food, power production. It can be desirable for environmental concerns and/or for use of such target component as raw material in an industrial process.

The separation of a target component from a gaseous mixture (e.g. carbon dioxide from a flue gas) can be performed via chemical scrubbing, wherein the gaseous mixture is contacted with a liquid solution containing a compound suitable for selectively removing said target component. Said process requires an absorber wherein the solution selectively absorbs the target component and a desorber wherein the solution is regenerated by supplying thermal energy. However, chemical scrubbing has the drawback of requiring a solution which is generally toxic, harmful and subjected to degradation. When degraded, the solution needs be replaced involving a significant cost.

Another process is temperature swing adsorption (TSA). Said process makes use of a solid adsorbent and requires alternate phases of heating and cooling of the solid adsorbent in order to carry out the adsorption and regeneration (desorption), respectively.

A TSA process for the separation of a target component from at least one side component in a gaseous mixture comprises basically: (a) an adsorption step in which the target component is adsorbed on an adsorbent bed and a side product-rich stream is produced; (b) a heating step of the loaded adsorbent during which the target component is released from the adsorbent bed and a target product-rich stream is produced; (c) a cooling step during which the adsorbent is cooled back to the adsorption temperature.

The TSA process is of great interest but still has some disadvantages.

A first drawback is a low separation performance, hence low recovery and low purity of the target product. In order to achieve a successful separation of the target component, novel adsorbents have been tested, but poor results have been achieved so far.

A second drawback is a high energy input (measured in MJ/kg of the recovered target product). Said energy input includes the thermal energy required to regenerate the adsorbent and desorb the target component. In most cases, the gaseous mixture and the obtained target component contain some water, and said energy input also comprises the thermal energy required for drying the target product.

Said two drawbacks are related. In particular, a low recovery of the target product implies a higher energy requirement for the drying operation, because more gas must be dried for the same target product production rate.

A further disadvantage is a low productivity of the target product, hence high capital cost. The term "productivity" refers to the mass flow rate of the target product produced per unit adsorbent mass and is measured in kg/h of recovered CO2 over tons of adsorbent.

Referring in particular to the separation of carbon dioxide, the need for high performances, low energy consumption and low cost is strongly felt. CO2 recovered from a flue gas can be used as chemical feedstock to produce urea or methanol or to enhance oil recovery; CO2 capture from the fumes of a combustion process minimizes carbon dioxide emissions into atmosphere; CO2 removal from air is also attractive for a number of industrial uses.

US 2014/0326136 discloses TSA systems and methods for purifying fluids using the same.

SUMMARY OF THE INVENTION

The invention aims to overcome the drawbacks of the prior art. In greater detail, the invention aims to provide a process which is able to achieve high purity and high recovery of the target component, low energy consumption, high productivity and low capital costs.

This aim is reached with a temperature swing adsorption process for removing a target component from a gaseous mixture according to claim 1.

Said process is carried out in a plurality of reactors and each reactor performs the following steps:
(a) an adsorption step, comprising contacting an input stream of said gaseous mixture with a solid adsorbent and adsorption of target component from said input stream, providing a target component-loaded adsorbent and a waste stream depleted of the target component;
(b) heating of said loaded adsorbent and desorption of a first amount of target component, providing a partially regenerated adsorbent and a first output stream containing the desorbed target component;
(c) cooling of said at least partially regenerated adsorbent, The process of each reactor is characterized by:
a rinse step (a1) after said adsorption step (a) and before said heating step (b), wherein said loaded adsorbent is contacted with a rinse stream containing the target component, wherein an amount of target component contained in said rinse stream is adsorbed and a purge stream depleted of the target component is produced;
a purge step (b1) before said cooling step (c), wherein the partially regenerated adsorbent is contacted with at least a portion of the purge stream which is provided by at least one other reactor of said plurality of reactors while performing the rinse step (a1), wherein a second amount of target component is released providing a second output stream containing the target component,
wherein the rinse stream used in said rinse step (a1) comprises at least a portion of the second output stream provided by at least one other reactor of said plurality of reactors while performing the purge step (b1).

During the cooling step (c), the adsorbent is advantageously cooled to a temperature suitable for conditioning the solid adsorbent and carrying out the adsorption step (a), so that the cycle can start again.

Preferably, said process is carried out in a plurality of reactors containing an adsorbent or multiple layers of adsorbents and each reactor performing the above mentioned steps. Said adsorbent is preferably a fixed bed adsorbent.

During the adsorption step (a) at least a portion of the target component contained in the input stream is adsorbed. Preferably the full amount or substantially the full amount of the target component in the input stream is adsorbed.

According to a preferred embodiment of the invention, the purge stream for the purge step of a reactor and the rinse stream for the rinse step of the same reactor are provided by two different reactors. In other words, according to a preferred embodiment, a generic reactor while performing the above sequence of steps, interfaces with at least two other reactors, as it takes the purge stream from one reactor of the plurality (source reactor of the purge stream), and takes the rinse stream from another reactor (source reactor of the rinse stream).

Preferably, said process is carried out in a plurality of reactors wherein a first reactor performs the purge step thus providing the output stream containing the target component and a second reactor performs the rinse step thus providing the purge stream depleted of the target component, and wherein at least a portion of said output stream is used as rinse stream for the rinse step of said second reactor and at least a portion of said purge stream is used for the purge step of said first reactor, thus forming a closed loop between said first and second reactor. Preferably, a compressor is used to circulate the rinse stream and the purge stream between the first and the second reactor, thus forming said closed loop.

Preferably, the output stream of a reactor undergoing the purge step is entirely or substantially entirely used as rinse stream for the rinse step of another reactor. Preferably, the rinse stream consists of said output stream. For the sake of simplicity, the terms of output stream and rinse stream will be used indistinctly in the following description.

Preferably, the purge stream of a reactor undergoing the rinse step is entirely or substantially entirely used for the purge step of another reactor.

In some embodiments of the invention, said rinse stream is exchanged from a reactor undergoing the purge step to another reactor undergoing the rinse step without an intermediate storage. This means that the rinse step and the purge step of two different reactors exchanging said rinse stream are synchronized and while one reactor performs the purge step the other reactor performs the rinse step.

In other embodiments of the invention, said rinse stream is exchanged from a reactor undergoing the purge step to another reactor undergoing the rinse step with an intermediate storage in a suitable tank. This means that the rinse step and the purge step of two different reactors exchanging said rinse stream are not synchronized. The embodiments with said intermediate storage provide a greater flexibility since the duration of the rinse and purge of the two reactors may be different.

Similarly, the above identified purge stream may be exchanged with or without an intermediate storage in a suitable tank from a reactor undergoing the rinse step to another reactor undergoing the purge step.

The adsorbent is preferably cooled by contact with the purge stream. In some embodiments, said purge stream passes from the respective source reactor to the reactor wherein the purge step takes place without any heat exchange, i.e. there is no heat exchanger between the reactors. In other embodiments, said purge stream is cooled before being used for said purge step (b1). Preferably, said purge stream is cooled in an external heat exchanger prior to be subjected to the corresponding step. Said external cooling enhances the adsorbent cooling during said step.

Preferably, said purge stream is cooled down to a temperature which is lower than the temperature of the gaseous mixture subjected to the adsorption step (a). Preferably said purge stream is cooled down to a temperature in the range 5° C. to 40° C. According to different embodiments it can be cooled to ambient temperature (e.g. 25° C.) or below ambient temperature (e.g. 10° C.).

The adsorbent is preferably heated by contact with the rinse stream. Said rinse stream can be optionally heated before being subjected to said step of rinse (a1). In some embodiments there is no heat exchanger between the source reactor of the rinse stream and the reactor undergoing the rinse step. In other embodiments said rinse stream is heated in an external heat exchanger. Said external heating enhances the adsorbent heating during said step.

The embodiments wherein said purge and rinse streams are cooled and heated before said steps of purge and rinse, respectively, provide a greater flexibility in terms of thermal exchanges. For example, by heating said rinse stream a greater amount of heat may be transferred to the reactor undergoing the heating step (b) and/or the time duration of the heating step (b) can be shortened.

According to some embodiments, the heating step (b) comprises direct heat exchange with a heating medium in contact with the adsorbent. Accordingly, all or some of the heat transferred in the heating step (b) is transferred by direct heat exchange. Preferably, said heating medium is a stream containing predominantly the target component. For example, said heating medium is provided by the above identified output stream of a reactor undergoing the purge step (b1) and the output stream of a reactor undergoing the heating step (b).

Similarly, the cooling step (c) may comprise direct heat exchange with a cooling medium in contact with the adsorbent. Accordingly, all or some of the heat transferred in the cooling step (c) is transferred by direct heat exchange. Preferably, said cooling medium is a stream depleted of the target component and preferably containing said at least one side component. For example, said cooling medium is provided by the above identified waste stream of a reactor undergoing the adsorption step (a) or the above identified purge stream of a reactor undergoing the rinse step (a1).

According to a preferred embodiment, during the cooling step (c) the adsorbent is contacted with the waste stream (or a portion thereof) provided by at least one other reactor of said plurality of reactors while performing the adsorption step (a). Said waste stream (or portion thereof) is optionally cooled prior to said cooling step (c).

According to other embodiments, at least one of the heating step (b) and the cooling step (c) comprises indirect heat exchange. In such embodiments, all or some of the heat is transferred by indirect heat exchange.

Further embodiments comprise both direct and indirect heat exchange for said heating step (b) and/or said cooling step (c). Accordingly, the heat transferred in step (b) and/or (c) may be partially transferred via direct heat exchange and partially via indirect heat exchange.

Indirect heat exchange denotes that the heat exchange takes place with a surface of separation between the adsorbent and a heat transfer (heating or cooling) medium. In some embodiments, suitable heat exchange bodies such as plates or tubes are immersed in the adsorbent and fed with said medium. Some embodiments use tubes filled with the adsorbent and a heat exchange medium which is fed outside the tubes, for example in the shell side of an absorber.

Direct heat exchange has the advantage that the adsorbent is directly contacted with a heating or cooling medium, which avoids the installation of heat exchange bodies, thus reducing the thermal inertia and ensuring a better heat exchange. On the other hand, indirect heat exchange may be preferred because the absence of a contact between the adsorbent and the heating or cooling medium ensures a higher working capacity of the adsorbent and provides more freedom to select the heat exchange fluids.

The rinse step (a1) entails adsorption of some of the target component contained in said rinse stream, which causes heat of adsorption to be released. Accordingly, the rinse step (a1) provides for an increased purity of the recovered target component. In addition, the applicant has surprisingly found that the rinse step (a1) is made much faster due to the heat of adsorption released. This is beneficial especially for the productivity of the cycle.

The purge step (b1) entails displacement of non-adsorbed target component by means of the at least one side-component contained in the purge stream and may also entail desorption of an amount of target component not previously desorbed during the heating step (b). The released target component is recycled to another reactor undergoing the rinse step (a1), wherein it is recovered. Accordingly, the purge step (b1) provides for an increased recovery of the target component. Moreover, the purge step (b1) is made much faster due to the energy subtracted by the heat of adsorption, which is beneficial for the productivity of the cycle.

An important aspect of the present invention is that a "closed loop" may be formed between a reactor performing the rinse step and another reactor performing the purge step. In other words, a reactor performing the rinse step receives a target component containing-rinse stream from another reactor which is performing the purge step and to which it supplies a target component depleted-purge stream. The presence of such loop avoids possible losses of the target component contained in the purge gas, which is subjected to the purge step in another reactor instead of being emitted into the atmosphere as waste stream. This provides for an enhanced recovery of CO2. Another advantage is that, in the case of synchronized steps for rinse (a1) and purge (b1), the closed loop configuration either allows to drop a constraint in the scheduling, or makes it possible to avoid a storage tank.

According to some embodiments, during the adsorption step (a) a portion of said at least one side component is unavoidably adsorbed together with the target component. According to a preferred embodiment, a preliminary heating (a2) is performed after said rinse step (a1) and before said heating step (b), during which a gaseous product containing said at least one side component is released from the adsorbent and is then recirculated and submitted to a further adsorption step (a) or to a further rinse step (a1). Said gaseous product may be recycled within the same reactor, after an intermediate storage, or within another reactor undergoing the adsorption step (a) or the rinse step (a1), after an intermediate storage. For the sake of clarity, the heating step (b) will be also referred as main heating.

The time duration of the preliminary heating (a2) is preferably from 0.1 to 10 times the time duration of the rinse (a1), more preferably six times the duration of the rinse (a1). Moreover, the time duration of the main heating (b) is preferably from 10 to 70 times the time duration of the rinse (a1). The time duration of the cooling (c) is preferably from 10 to 50 times the time duration of the purge (b1).

The above time durations allow to obtain high values of purity and recovery, as well as high productivity and low energy consumption.

Indeed, a shorter time duration of the main heating (b) or the cooling (c) would compromise the $CO_2$ purity and $CO_2$ recovery. On the other hand, a longer time duration would be beneficial in terms of purity and recovery, but detrimental for the productivity of the cycle.

A shorter time duration of the rinse (a1) would instead decrease the energy consumption and improve the productivity, but would compromise the $CO_2$ purity. On the other hand, a longer time duration would increase the $CO_2$ purity, but worsen the productivity and increase the energy demand.

Hence, the time durations found by the applicant represent the close-to-optimal values.

During the preliminary heating (a2) a portion of the target component can be desorbed together with the side component(s), which means that the gaseous product released during said preliminary heating (a2) also contains a portion of the target component. The preliminary heating (a2) is controlled in order to desorb a stream predominantly made of the side component(s) adsorbed during the previous adsorption step (a), and in order to reduce the desorption of the target component.

To this purpose, the preliminary heating (a2) is carried out at a suitable low temperature and/or time durations. More in detail, said preliminary heating (a2) reaches a temperature which is lower than the temperature reached during the subsequent main heating (b). Preferably, the temperature of the preliminary heating (a2) is at least 40° C. lower than the temperature of the subsequent main heating (b).

Accordingly, the majority of the target component remains in the adsorbent to be released during the subsequent main heating (b), and the gaseous effluent of the preliminary heating (a2) contains a significant amount of the at least one side component. In preferred embodiments said gaseous effluent contains predominantly said at least one side component. Preferably, said gaseous product contains 20% or more of the side component, more preferably 50% or more of the side component. In typical embodiments it contains 30 to 80%, more preferably 50% to 80% of the side component.

The target component desorbed during the preliminary heating (a2) can be recovered within the same reactor, after an intermediate storage, or within another reactor undergoing the adsorption step (a) or the rinse step (a1). When the gaseous product from the preliminary heating (a2) of one reactor is sent to another reactor, an intermediate storage in a suitable tank may also be provided in some embodiments.

According to a first embodiment, said preliminary heating (a2) comprises indirect heat exchange. According to a second embodiment, said preliminary heating (a2) comprises direct heat exchange with a heating medium in contact with the adsorbent, said heating medium being preferably a stream predominantly containing the target component.

The applicant has surprisingly found that the implementation of said preliminary heating (a2) after said rinse step (a1) and before said main heating (b) with the closed loop entails reaching a high purity and recovery of more than 95% of the target component with a low energy consumption and a high productivity.

According to a preferred application of the invention, the target component is carbon dioxide. Preferably, said at least one side component includes nitrogen.

The gaseous mixture may contain some water. Water may be detrimental to the adsorption of the target component, e.g. water may compete with the target component during adsorption over a number of adsorbents. The process of the invention may optionally include a preliminary step of removal of water from the gaseous mixture prior to adsorption of the target component, or may optionally use a specific adsorbent which is also selective over water.

According to some embodiments, the adsorbent is selective for adsorption of the target component over the side component(s) and also over water. In the case of carbon dioxide as the target component, a chemical adsorbent chosen among MOF (Metal Organic Framework), MOMs (Metal Organic Materials) such as those indicated in U.S. Pat. No. 9,138,719, CPO27, UTSA16, UIO66, amine-doped MOFs is preferably used thanks to its high capacity and high selectivity of adsorbing carbon dioxide over water.

According to further embodiments, the adsorbent comprises a first layer of a first material suitable for selectively adsorbing water and a second layer of a second material suitable for selectively adsorbing the target component (e.g. carbon dioxide). Accordingly, the adsorption step comprises removal of water in the first layer and then removal of the target component in the second layer. Said materials are preferably regenerated in the same temperature range.

According to further embodiments, said gaseous mixture is subjected to a dehydration process before contacting the adsorbent in order to at least partially remove water. Preferably, said dehydration process is carried out using an adsorbent material adapted to selectively adsorb water. Examples of such materials include silica, activated alumina, 4A zeolite. In the case of carbon dioxide as target component and nitrogen as side component, adsorbents such as zeolite 13X, zeolite 5A, zeolite 4A, zeolite ZSM5, activated carbon are preferably used, having high capacity and high selectivity for the CO2 over the $N_2$.

A further aspect of the invention is a relatively low temperature of the main heating (b), that is a low regeneration temperature. Said temperature is preferably not greater than 250° C., more preferably not greater than 200° C. and even more preferably not greater than 170° C. A low regeneration temperature is an advantage because it entails a greater difference of temperature (delta-T) between the adsorbent and the available heat source, or enables using a lower temperature heat source, thus making regeneration more efficient.

The gaseous mixture can be a flue gas, for example from a combustion process. Said flue gas may come from a power plant or from a chemical process, according to preferred applications of the invention. Preferably, said gaseous mixture is a flue gas of an ammonia or methanol or urea plant. The recovered target component can be sequestrated (e.g. $CO_2$ sequestration) or used in another process, depending on the case.

An object of the present invention is the use of the above described process for treating a flue gas of an ammonia or methanol or urea plant. In case of methanol or urea plant, some embodiments include the use of recovered $CO_2$ as a feedstock.

A plant for carrying out said process is also object of the present invention.

The present invention allows to operate several reactors in a synchronous manner, with the operating cycles of the different reactors properly shifted in time. This is advantageous for most applications, wherein a continuous operation is desired.

Cycle scheduling consists in determining the number, sequence and duration of the cycle steps, including any necessary idle times, and the number and connections of reactors required to run a continuous operation. This has an effect on the effective productivity of the cycle, defined as the amount of produced target compound per unit time and adsorbent mass.

The schedule will depend on the imposed constraints, e.g. continuous feed, continuous production, synchronization of the rinse step (a1) and the purge step (b1). A further constraint that may be considered for the TSA cycle of the invention is that of having a reactor starting the cooling step (c) at the same time when another reactor starts the main heating (b), thus allowing the reuse of a hot thermofluid present in the former reactor to heat up the latter reactor (so called temperature equalization).

For continuous $CO_2$ capture from flue gases, the scheduling shall ensure the possibility to treat a continuous feed and produce a target component stream at all times, while at the same time guaranteeing: synchronization of the rinse step (a1) and the purge step (b1), and synchronous start of the heating step (b) and the cooling step (c).

The advantages of the invention will be elucidated with the help of the following description of preferred and non-limiting embodiments.

DETAILED DESCRIPTION OF PREFERRED EMBODIMENTS

First Embodiment

Figure 1:
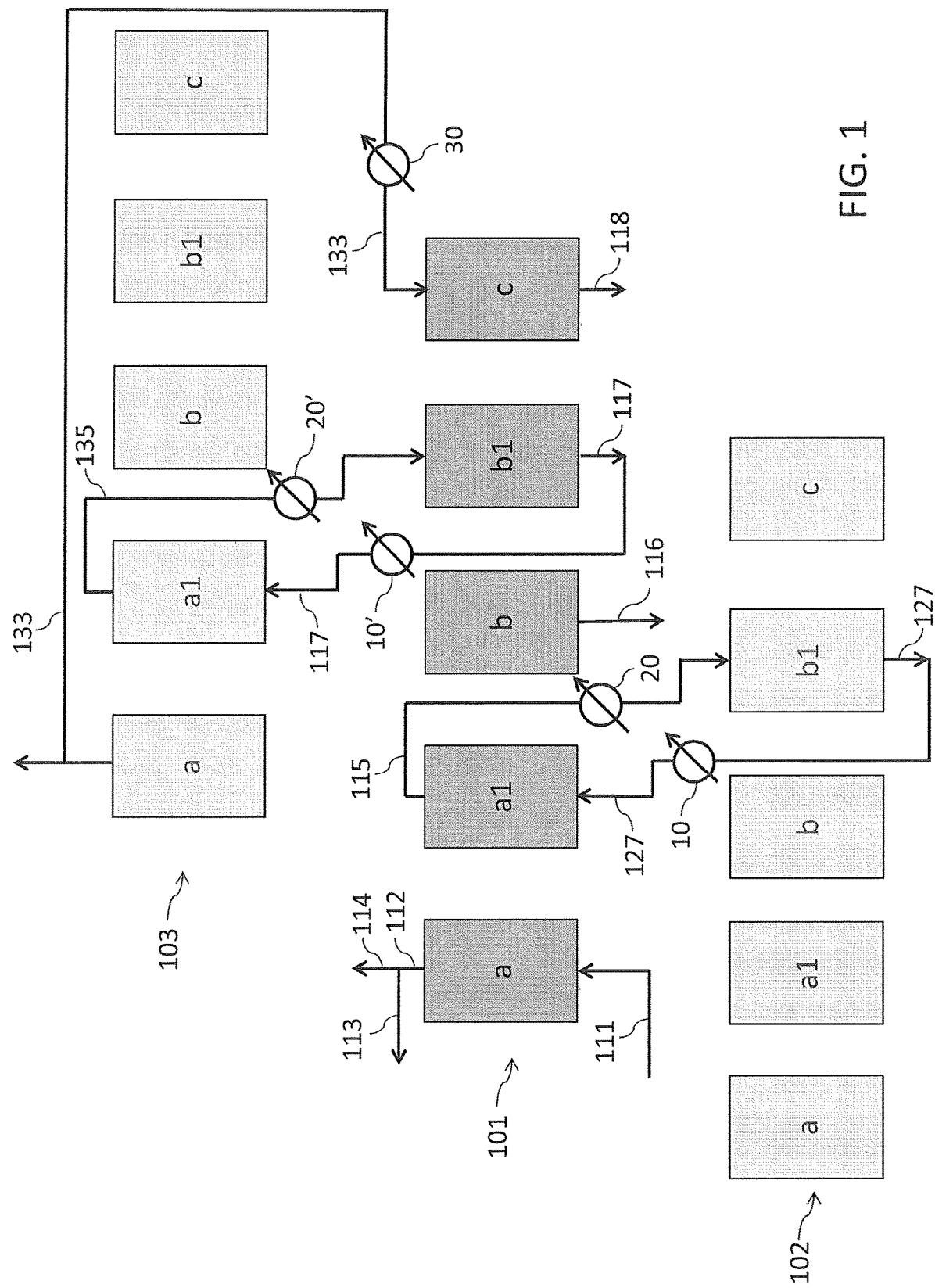
FIG. 1 is a block diagram of a temperature swing adsorption process for removing the carbon dioxide from a flue gas, according to a first embodiment of the invention.

Referring to FIG. 1, the process of the invention is carried out in a plurality of reactors, for example including reactors 101, 102, 103. Each reactor 101-103 contains a fixed bed of an adsorbent for a target component, for example zeolite 13X for adsorption of $CO_2$.

Each reactor performs a number of steps, namely: an adsorption step (a), a rinse step (a1), a heating step (b), a purge step (b1) and a cooling step (c). The reactors are interconnected and, during some of said process steps, a reactor may exchange one or more stream(s) with one or more other reactor(s). In FIG. 1, the blocks (a), (a1), (b), (b1), (c) denote the reactors 101, 102, 103 while performing said process steps.

During adsorption step (a), a gas to be treated, for example a flue gas, is admitted to the reactor and the target component is adsorbed, resulting in a waste stream and partially loading the adsorbent with the target component. During the rinse step (a1), the adsorbent is slightly heated by direct contact with a stream rich of the target component which comes from the purge step (b1) of another reactor. As a consequence, a further amount of the target component can be adsorbed and the one or more side components are expelled, thus generating a purge stream. During the heating step (b), the adsorbent is heated by direct or indirect heat exchange, resulting in desorption of the target component and regeneration of the adsorbent. The purge step (b1) is made with the help of the purge stream taken from the rinse step (a1) of another reactor. Step (c) is the cooling step, which is made with the help of at least a portion of the waste stream (mainly containing the one or more side components) taken from the adsorption step (a) of another reactor. Said step (c) brings the adsorbent back to the adsorption temperature in order to start again the cycle with step (a). Said steps and said interactions between the reactors will be described in greater detail with reference to the working cycle of reactor 101.

Adsorption Step (a)

A flue gas 111 coming from a combustion process and containing predominantly carbon dioxide ($CO_2$) and nitrogen ($N_2$) and optionally containing water is supplied to the reactor 101, where $CO_2$ is adsorbed over the zeolite bed of the reactor, the $CO_2$ having a greater affinity with said adsorbent compared to nitrogen.

As a result, step (a) provides a $CO_2$-loaded adsorbent and a $CO_2$-depleted effluent 112, containing predominantly $N_2$. A portion 113 of said effluent 112 can be used for the cooling step (c) of another reactor (for example of reactor 103), as will be explained below. The remaining portion 114 of the effluent 112 is exported and can be vented or used for a further scope if appropriate. For example in an ammonia plant, said stream 114, which is rich in nitrogen, can be used for the synthesis of ammonia.

Preferably, the adsorption step (a) takes place at ambient temperature, for example at a temperature in the range 15 to 30° C. Preferably said step (a) is carried out upflow, which means that the flue gas 111 is supplied from the bottom of the reactor 101 and the waste stream 112 leaves the reactor 101 from the top, being $N_2$ lighter than $CO_2$.

Rinse Step (a1)

The reactor 101 receives a gaseous $CO_2$-rich rinse stream 127 produced by another reactor of the plurality, for example by the reactor 102, while performing the purge step (b1). Said rinse stream 127 is fed to the bottom of the reactor 101, meaning that step (a1) is carried out in the same upflow direction as step (a).

The rinse stream 127 is optionally heated in an external heat exchanger 10 prior to admission to said reactor 101. For example the rinse stream 127 is heated to a temperature of 343 K (70° C.).

During said step (a1), some of the carbon dioxide contained in the rinse stream 127 is adsorbed over the adsorbent bed, which is already partially loaded with $CO_2$ as a consequence of the previous adsorption step (a); another waste stream 115 mainly containing $N_2$ is obtained, which is used for the purge step (b1) of another reactor (for example of reactor 102), as will be explained below. Said waste stream 115 will be also referred to as purge stream. Said purge stream may however contain some CO2.

Said purge stream 115 is optionally cooled in an external heat exchanger 20 prior to admission to said reactor 102. For example the purge stream 115 is cooled to a temperature of 283 K (10° C.).

Contrary to what happens to the waste stream 112 or to a part 114 thereof, said purge stream 115 is neither exported from the process nor vented into atmosphere. This is advantageous because possible losses of CO2 are avoided.

In some embodiments, the rinse step (a1) of reactor 101 and the purge step (b1) of reactor 102 are synchronized, which means that the rinse stream 127 leaving the reactor 102 passes into the reactor 101 without an intermediate storage. In other embodiments, said $CO_2$-rich gas 127, produced by the purge step (b1) of reactor 102, is stored in a suitable tank (not shown) outside the source reactor 102 and subsequently introduced into the reactor 101 for the above described rinse step (a1). The latter embodiment with intermediate storage may provide a greater flexibility since the duration of steps (a1) and (b1) of the two reactors may be different.

Similarly, the purge stream 115 may be exchanged with or without an intermediate storage in a suitable tank from a reactor undergoing the rinse step (a1) to another reactor undergoing the purge step (b1).

Heating Step (b)

The $CO_2$-loaded adsorbent is heated, for example to 420 K (147° C.); as a consequence, $CO_2$ is desorbed producing a current 116 of $CO_2$ of high purity and the adsorbent of the reactor 101 is partially regenerated.

The heating step (b) can be performed either by means of indirect heat exchange or direct heat exchange.

In case of indirect heat exchange, one of the reactor ends is kept open while the other is kept closed, meaning that it is a semi-open heating step.

In case of direct heat exchange, a hot regeneration medium is supplied to the reactor for direct contact with the adsorbent. Preferably, both ends of the reactor 101 are kept open and said regeneration medium flows opposite with respect to steps (a) and (a1), namely from the top to the bottom. Preferably said regeneration medium is made predominantly of $CO_2$ (i.e. of the target component).

Purge Step (b1)

The adsorbent in the reactor 101 is purged with a purge stream 135 which results from the rinse step (a1) of another reactor, for example of reactor 103. Said stream 135 is similar in composition to the previously described stream 115 obtained in the reactor 101 itself. Said purge stream 135 is fed to the reactor 101 from the top, meaning that step (b1) is carried out in the opposite flow direction with respect to steps (a) and (a1).

Said purge stream 135 is optionally cooled in an external heat exchanger 20' prior to admission into the reactor 101. For example the purge stream 135 is cooled to a temperature of 283 K (10° C.).

During said purge step (b1), the purge stream 135 "cleans" the adsorbent by displacing a $CO_2$-rich stream 117, so that more $CO_2$ can be adsorbed during the adsorption step (a) and the recovery is increased. Said $CO_2$-rich stream 117 is advantageously subjected to the rinse step (a1) of another reactor, in the same manner as the $CO_2$-rich stream 127 previously described. Said stream 117 is optionally heated in an external heat exchanger 10'.

Purge streams 115, 135 may be routed to suitable compressors (not shown) before being subjected to reactors 102, 101 performing the purge step (a1), respectively.

Similarly, rinse streams 117, 127 may be routed to suitable compressors (not shown) before being subjected to reactors 103, 101 performing the rinse step (a1), respectively.

Said compressors ensure circulation of the gas in the closed loop 115-127-115 between reactors 102, 101 and in the closed loop 135-117-135 between reactors 101, 103.

In some embodiments, the rinse step (a1) of reactor 103 and the purge step (b1) of reactor 101 are synchronized, so that the purge stream 135 leaving the reactor 103 passes into the reactor 101 without an intermediate storage. In other embodiments, a storage tank for said stream 135 is provided.

Cooling Step (c)

The adsorbent is cooled down to the adsorption temperature in order to restart the cycle.

The cooling step (c) can be performed either by means of indirect heat exchange or by means of direct heat exchange.

According to the example of the figure, a waste stream 133 provided by reactor 103 while performing the adsorption step (a) is supplied to the reactor 101, wherein it directly contacts the adsorbent acting as cooling medium. Accordingly, both ends of the reactor 101 are kept open and the waste stream 133 flows opposite with respect to steps (a) and (a1), namely from the top to the bottom, leaving the reactor as stream 118. Alternatively, step (c) is semi open and the waste stream 133 only pressurizes the reactor.

The waste stream 133 is optionally cooled in an external heat exchanger 30 prior to admission to said reactor 101.

The other reactors, such as reactors 102 and 103, perform the same steps.

Second Embodiment

Figure 2:
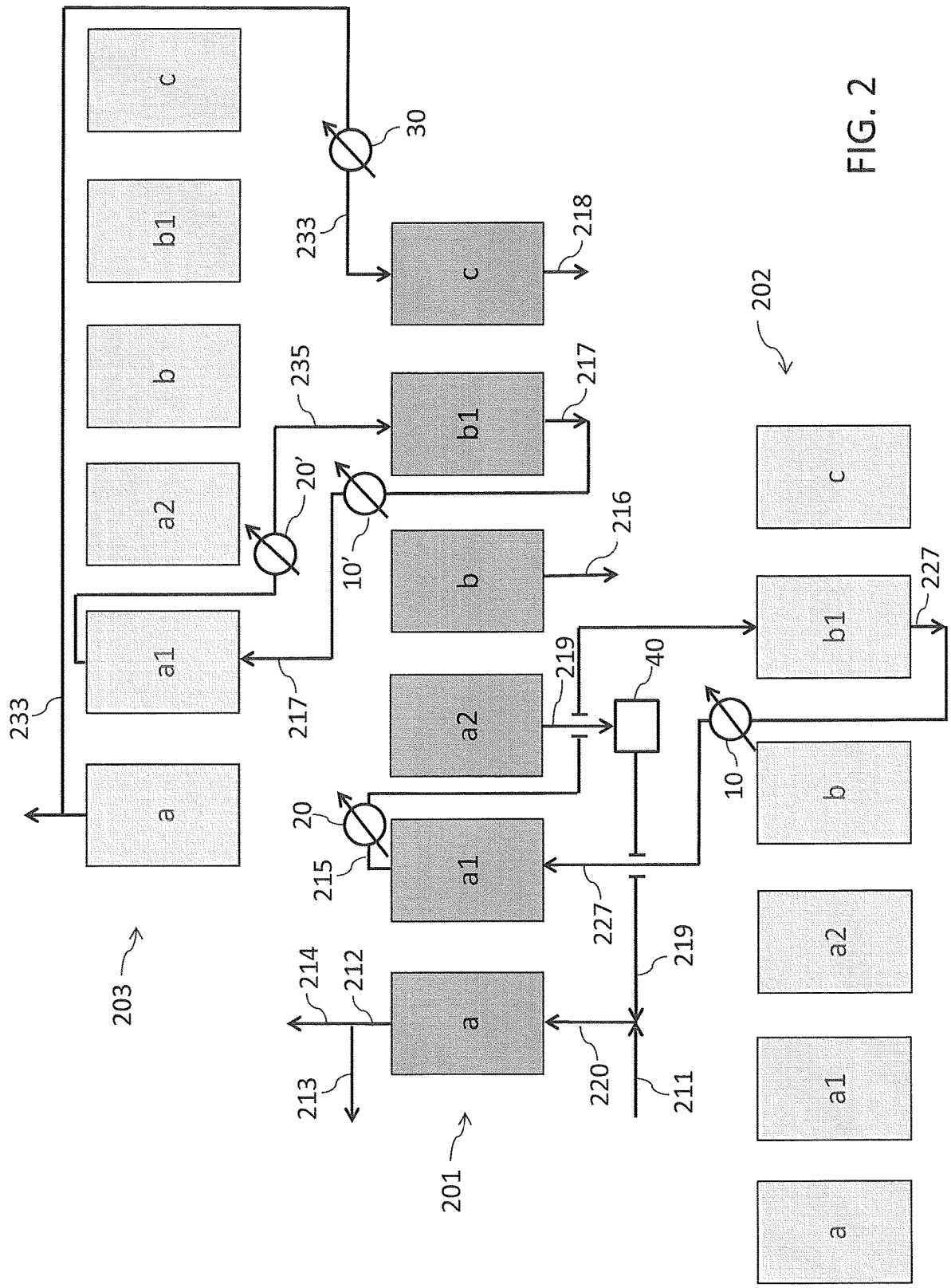
FIG. 2 is a block diagram of a temperature swing adsorption process, according to a second embodiment of the invention.

Referring to FIG. 2, the process of the invention is carried out in a plurality of reactors, for example including reactors 201, 202, 203. Each reactor 201-203 contains a fixed bed of an adsorbent for a target component, for example zeolite 13X for adsorption of $CO_2$.

Each reactor performs a sequence of steps which is the same sequence as the first embodiment, with the addition of a preliminary heating step (a2), after the rinse step (a1) and before the heating step (b). The steps common to the first embodiment are not described in detail for the sake of brevity. In order to better distinguish step (a2) from step (b), the latter will be referred to as main heating step.

Combining steps (a1) and (b1) with a further pre-heating step (a2) gives rise to a synergy, which allows to obtain the high recovery and purity of step (a2) and the low energy consumption of steps (a1) and (b1).

Referring to a reactor 201, a gas mixture 211 containing predominantly carbon dioxide ($CO_2$) and nitrogen ($N_2$) is mixed with a gaseous product 219 predominantly containing $N_2$ and a small amount of $CO_2$, obtained from said preliminary heating step (a2), to provide a gaseous input stream 220.

Said input stream 220 is supplied to the reactor 201 for the adsorption step (a) wherein a waste stream 212 is produced and the adsorbent is loaded with $CO_2$. A portion 213 of the waste stream can be used for cooling another reactor and the remaining portion 214 is exported or vented.

Then, the reactor 201 undergoes the rinse step (a1) with the help of a rinse stream 227 from the reactor 202 undergoing the purge step (b1), optionally with intermediate heating in the exchanger 10.

During said rinse step (a1), some of the carbon dioxide contained in the rinse stream 227 is adsorbed over the adsorbent bed and a purge stream 215 mainly containing $N_2$ is obtained, which is used for the purge step (b1) of reactor 202. Said purge stream 215 is optionally cooled in an external heat exchanger 20 prior to admission to said reactor 202.

Then, the reactor 201 undergoes the preliminary heating step (a2), during which the $CO_2$-loaded adsorbent contained in the reactor 201 is further heated. The temperature reached by the adsorbent during said preliminary heating step (a2) is lower than the temperature reached during the subsequent main heating step (b). For example, the adsorbent is heated to a temperature ranging between 360 and 380 K (i.e. between 87 and 107° C.) during said preliminary heating step (a2).

During said step (a2), the nitrogen and a small amount of $CO_2$ are desorbed providing the gaseous product 219. During said step (a2), the pressure is kept constant and only the bottom end of the reactor is kept open.

In some embodiments, the so obtained gaseous product 219 is stored in a tank 40 and subsequently mixed with the flue gas 211 to provide the gaseous stream 220 feeding the adsorption step (a), in order to recover the $CO_2$ contained therein. In other embodiments (not shown), said gaseous product 219 is mixed with the flue gas feed of another reactor, for example of reactor 202 or 203.

After the preliminary heating step (a2), the reactor 201 undergoes the sequence of main heating (b), purge (b1) and cooling (c).

The purge step (b1) is carried out with the help of a purge stream 235 taken from reactor 203, optionally with intermediate cooling in a heat exchanger 20', and releases a $CO_2$-rich stream 217 which is advantageously subjected to the rinse step (a1) of reactor 203. Said stream 217 is optionally heated in an external heat exchanger 10'. The main heating (b) releases a stream 216 of the target component, in this case of $CO_2$. The cooling step (c) is performed with the aid of a waste stream 233 provided by reactor 203 performing the adsorption step (a), which acts as cooling medium and leaves the reactor as stream 218. The waste stream 233 is optionally cooled in an external heat exchanger 30 prior to admission to said reactor 101.

Similarly to embodiment 1, suitable compressors ensure circulation of the gas in the closed loop 215-227-215 between reactors 202, 101 and in the closed loop 235-217-235 between reactors 201, 203.

The other reactors, such as reactors 202 and 203, perform the same steps.

COMPARATIVE EXAMPLES

Example 1

A flue gas with the following molar composition:
$CO_2$=0.12, $N_2$=0.88
is subjected to a process carried out in a plurality of interconnected reactors, each containing a fixed bed of an adsorbent for CO2. Each reactor performs an adsorption step (a), a rinse step (a1), a heating step (b), a purge step (b1) and a cooling step (c).

During adsorption step (a), the flue gas is admitted to the reactor and CO2 is partially adsorbed, resulting in a waste stream and CO2-partially loaded adsorbent. During the rinse step (a1), the adsorbent is slightly heated by direct contact with a CO2-rich stream which comes from the purge step (b1) of another reactor, a further amount of CO2 is adsorbed and $N_2$ is expelled, thus generating another waste stream. During the heating step (b), the adsorbent is heated by direct or indirect heat exchange, resulting in CO2 desorption and regeneration of the adsorbent. The purge step (b1) is made with the help of a N2-containing waste stream taken from the adsorption step (a) of another reactor. The cooling step (c) brings the adsorbent back to the adsorption temperature in order to start again the cycle with step (a).

Figure 3:
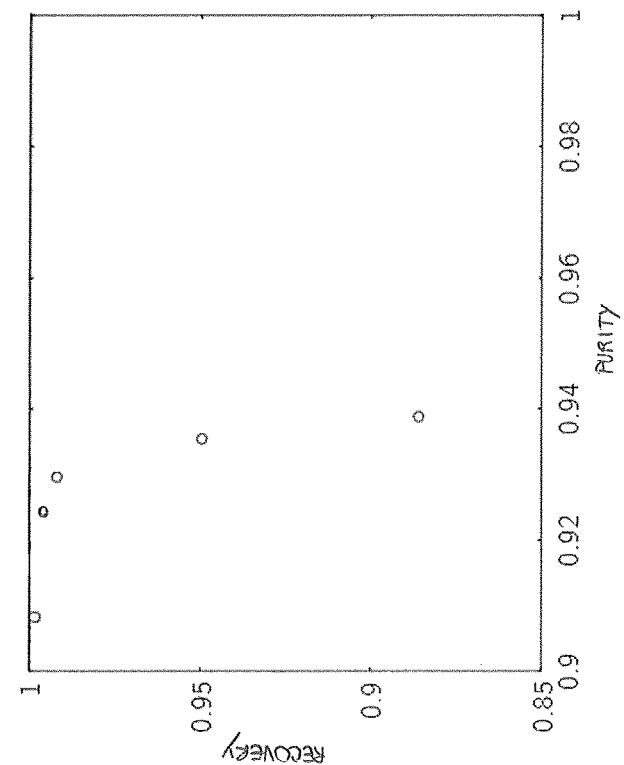
FIG. 3 is a purity vs recovery curve of a TSA process which is not object of the present invention.

By varying the time duration of the above five steps of adsorption (a), rinse (a1), heating (b), purge (b1) and cooling (c), the curve of FIG. 3 has been identified with computer simulation.

The curve of FIG. 3 delimits the maximum feasible $CO_2$ purity and $CO_2$ recovery in a two dimensional plot of purity vs recovery. As shown in FIG. 3, the maximum feasible purity is slightly higher than 99% but is achievable only for a recovery of 85%. On the other hand, the maximum feasible recovery is around 98% but is achievable only with a purity of around 98.5%.

Example 2

A combustion flue gas with the same composition of the gas of example 1 is subjected to a process carried out in a plurality of interconnected reactors, each containing a fixed bed of an adsorbent for CO2. Each reactor performs a sequence of steps which is the same sequence as the example 1, with the addition of a preliminary heating step (a2), after the rinse step (a1) and before the heating step (b).

The temperature reached by the adsorbent during the preliminary heating (a2) is lower than the temperature reached during the subsequent heating (b). During said step (a2), the nitrogen and a small amount of $CO_2$ are desorbed providing a gaseous product which is subsequently mixed with a flue gas feeding the adsorption step (a), thus recovering the $CO_2$ contained therein.

Figure 4:
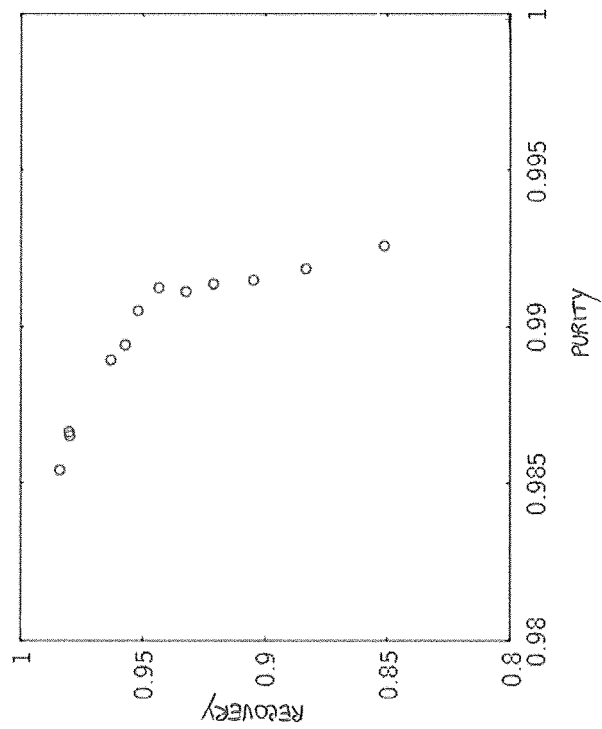
FIG. 4 is a purity vs recovery curve of another TSA process which is not object of the present invention.

By varying the time duration of the above six steps of adsorption (a), rinse (a1), preliminary heating (a2), heating (b), purge (b1) and cooling (c), the curve of FIG. 4 has been identified with computer simulation.

The curve of FIG. 4 delimits the maximum feasible $CO_2$ purity and $CO_2$ recovery in a two dimensional plot of purity vs recovery. As shown in FIG. 4, the maximum feasible purity is 94%, which is achievable for a recovery lower than 90%. For a unitary recovery, the purity is very low, i.e. lower than 91%.

Example 3: First Embodiment of the Invention

A combustion flue gas with the same composition of the gas of the previous examples is subjected to the process according to FIG. 1.

Figure 5:
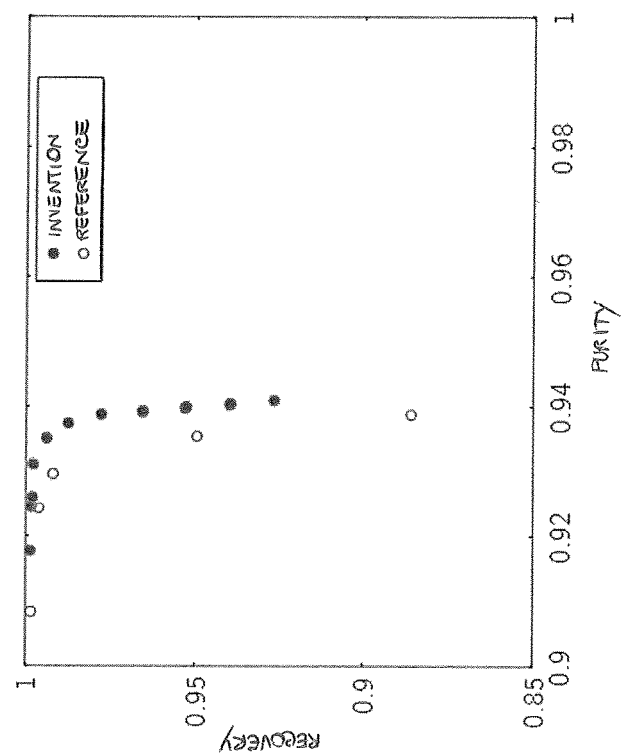
FIG. 5 shows a purity vs recovery curve of a TSA process according to the embodiment of FIG. 1, in comparison with the curve of FIG. 3.

FIG. 5 shows the curves delimiting the feasible $CO_2$ purity and $CO_2$ recovery for the process of FIG. 1 and the process of example 1 taken as reference. The process of FIG. 1 substantially distinguishes from the reference process in that it comprises a closed loop between a reactor performing the rinse step (a1) and another reactor performing the purge step (b1).

In greater detail, a first reactor performs the purge step providing an output stream containing the target component and a second reactor performs the rinse step providing a purge stream depleted of the target component. At least a portion of said output stream is used as rinse stream for the rinse step of said second reactor and at least a portion of said purge stream is used for the purge step of said first reactor, thus forming a closed loop between said first and second reactor.

The new process of FIG. 1 largely outperforms the process of example 1 in terms of CO2 recovery and CO2 purity.

As can be seen from FIG. 5, the "CO2 recovery" vs "CO2 purity" curve of the new process is shifted up and right with respect to the reference process. The improvement of the new process is due to the presence of a closed loop, which prevents loss of product and enables optimization of the time steps to achieve better separation performances than the reference process.

For example, for a CO2 purity of 99%, the new process allows to obtain a recovery of 98%, while the reference process allows to obtain a recovery of 95%.

Furthermore, for a CO2 recovery of 95%, the new process allows to obtain a purity greater than 99.5%, while the reference process allows to obtain a purity of 99%.

Example 4: Second Embodiment of the Invention

A combustion flue gas with the same composition of the gas of the previous examples is subjected to the process according to FIG. 2.

Figure 6:
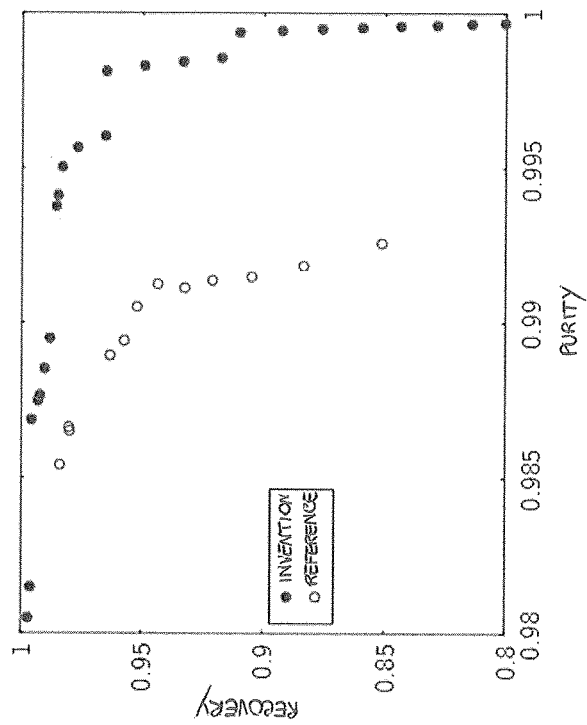
FIG. 6 shows a purity vs recovery curve of a TSA process according to the embodiment of FIG. 2, in comparison with the curve of FIG. 4.

FIG. 6 shows the curves delimiting the feasible $CO_2$ purity and $CO_2$ recovery for the process of FIG. 2 and the process of example 2 taken as reference. The process of FIG. 2 substantially distinguishes from the reference process in that it comprises a closed loop between a reactor performing the rinse step (a1) and another reactor performing the purge step (b1).

As can be clearly seen from FIG. 6, the "CO2 recovery" vs "CO2 purity" curve of the new process of FIG. 2 is shifted up and right with respect to the reference process of example 2. Accordingly, the new process largely outperforms the reference process in terms of CO2 recovery and CO2 purity. Also in this case, the improvement of the new process is due to the presence of a closed loop.

For example, for a CO2 purity of 93.5%, the new process allows to obtain a recovery of 98%, while the reference process allows to obtain a recovery of 95%.

Furthermore, for a CO2 recovery of 95%, the new process allows to obtain a purity of 94%, while the reference process allows to obtain a purity of 93.5%.

The invention claimed is:

1. A temperature swing adsorption process for removing a target component from a gaseous mixture containing at least one side component besides the target component, said temperature swing adsorption process being carried out in a plurality of reactors, wherein each reactor of the plurality of reactors performs a process comprising:
  (a) an adsorption step, comprising contacting an input stream of said gaseous mixture with a solid adsorbent and adsorption of target component from said input stream, providing a target component-loaded adsorbent and a waste stream depleted of the target component;
  (b) heating of said loaded adsorbent and desorption of a first amount of target component, providing a partially regenerated adsorbent and a first output stream containing the desorbed target component;
  (c) cooling of said at least partially regenerated adsorbent, the process of each of the plurality of reactors including:
    a rinse step (a1) after said adsorption step (a) and before said heating step (b), wherein said loaded adsorbent is contacted with a rinse stream containing the target component, wherein an amount of target component contained in said rinse stream is adsorbed and a purge stream depleted of the target component is produced;
    a purge step (b1) before said cooling step (c), wherein the partially regenerated adsorbent is contacted with at least a portion of the purge stream which is provided by at least one other reactor of said plurality of reactors while performing the rinse step (a1), wherein a second amount of target component is released providing a second output stream containing the target component;
    wherein the rinse stream used in said rinse step (a1) comprises at least a portion of the second output stream provided by at least one other reactor of said plurality of reactors while performing the purge step (b1),
    wherein a first reactor performs the purge step (b1) providing said second output stream and a second reactor performs the rinse step (a1) providing said purge stream, wherein at least a portion of said second output stream is used as rinse stream for the rinse step (a1) of said second reactor and at least a portion of said purge stream is used for the purge step (b1) of said first reactor, thus forming a closed loop between said first and second reactor.

2. The temperature swing adsorption process of claim 1, wherein said at least a portion of the purge stream and said at least a portion of the second output stream acting as rinse stream are provided by two different reactors.

3. The temperature swing adsorption process of claim 1, wherein said at least a portion of the second output stream used as rinse stream and said at least a portion of the purge stream are routed to compressors to ensure their circulation in the closed loop.

4. The temperature swing adsorption process of claim 1, wherein said at least a portion of the second output stream is exchanged with or without an intermediate storage in a tank from said at least one other reactor undergoing the purge step (b1) to said reactor undergoing the rinse step (a1), and said at least a portion of the purge stream is exchanged with or without an intermediate storage in a suitable tank from said at least one other reactor undergoing the rinse step (a1) to said reactor undergoing the purge step (b1).

5. The temperature swing adsorption process of claim 1, wherein said at least a portion of the purge stream is cooled prior to subjection to the purge step (b1).

6. The temperature swing adsorption process of claim 1, wherein said at least a portion of the second output stream is heated prior to subjection to said rinse step (a1).

7. The temperature swing adsorption process of claim 1, wherein said heating step (b) comprises direct heat exchange with a heating medium in contact with the adsorbent, said heating medium being a stream containing predominantly the target component.

8. The temperature swing adsorption process of claim 1, wherein the cooling step (c) comprises direct heat exchange with a cooling medium in contact with the adsorbent, said cooling medium being a target component depleted-waste stream.

9. The temperature swing adsorption process of claim 8, wherein the cooling step (c) comprises direct heat exchange with at least a portion of the waste stream provided by at least one other reactor of said plurality of reactors while performing the adsorption step (a), said at least a portion of the waste stream being optionally cooled prior to subjection to the cooling step (c).

10. The temperature swing adsorption process of claim 1, wherein the heating step (b) and/or the cooling step (c) comprises indirect heat exchange.

11. The temperature swing adsorption process of claim 1, each reactor of said plurality of reactors performing a preliminary heating step (a2) after said rinse step (a1) and before said main heating (b), wherein during said preliminary heating (a2) a gaseous product containing said at least one side component is released from the adsorbent and is recycled to a reactor undergoing the adsorption step (a) or the rinse step (a1).

12. The temperature swing adsorption process of claim 11, wherein at least one of the following conditions applies:
the time duration of the preliminary heating (a2) is from 0.1 to 10 times the time duration of the rinse step (a1);
the time duration of the heating step (b) is from 10 to 70 times the time duration of the rinse step (a1); or
the time duration of the cooling step (c) is from 10 to 50 times the time duration of the purge step (b1).

13. The temperature swing adsorption process of claim 1, wherein the temperature of the heating step (b) is not greater than 250° C.

14. The temperature swing adsorption process of claim 13, wherein the temperature of the heating step (b) is not greater than 200° C.

15. The temperature swing adsorption process of claim 13, wherein the temperature of the heating step (b) is not greater than 170° C.

16. The temperature swing adsorption process of claim 1, wherein said target component includes carbon dioxide.

17. The temperature swing adsorption process of claim 1 wherein said gaseous mixture includes a flue gas.

18. The temperature swing adsorption process of claim 17, wherein said flue gas includes a flue gas of an ammonia plant, methanol plant, or urea plant.

19. A plant for treating a gaseous mixture and removing a target component from said gaseous mixture with the process of claim 1, the plant comprising:
a plurality of reactors, each of the plurality of reactors containing an adsorbent bed for selectively adsorbing said target component, wherein:
each of the plurality of reactors operates a sequence of steps comprising: adsorption of the target component in the adsorbent bed, rinse of the adsorbent with a stream containing the target component, heating of the adsorbent for desorption of the target component, purge of the adsorbent with a stream depleted of the target component and cooling of the so obtained regenerated adsorbent,
wherein the reactors are interconnected so that each of the plurality of reactors:
during the purge step receives at least part of the stream depleted of the target component which is provided by at least one other reactor of said plurality of reactors while performing the rinse step;
during the rinse step receives at least part of the stream containing the target component which is provided by at least one other reactor of said plurality of reactors while performing the purge step; and
a first reactor performs the purge step (b1) providing an output stream and a second reactor performs the rinse step (a1) providing a purge stream, wherein at least a portion of said output stream of the first reactor is used as rinse stream for the rinse step (a1) of said second reactor and at least a portion of said purge stream of from the second reactor is used for the purge step (b1) of said first reactor, thus forming a closed loop between said first and second reactor.

* * * * *